United States Patent [19]

Desai et al.

[11] Patent Number: 4,653,439
[45] Date of Patent: Mar. 31, 1987

[54] TWO-CYCLE DIESEL ENGINE AND AIR BOX GUIDE INSERT THEREFOR

[75] Inventors: Jatinbabu B. Desai, Canton; Stanley J. Hinkle, Milford; John F. Pearce, Farmington, all of Mich.

[73] Assignee: General Motors Corporation, Detroit, Mich.

[21] Appl. No.: 761,061

[22] Filed: Jul. 31, 1985

[51] Int. Cl.⁴ .............................................. F02B 25/28
[52] U.S. Cl. .......................... 123/52 MV; 123/65 BA
[58] Field of Search .......................... 60/605, 609, 610; 123/52 M, 52 MV, 65 BA, 559

[56] References Cited

U.S. PATENT DOCUMENTS

| | | | |
|---|---|---|---|
| 1,802,544 | 4/1931 | Vincent | 123/52 MV |
| 2,504,973 | 4/1950 | Gehres . | |
| 2,864,350 | 12/1958 | Finley et al. . | |
| 2,963,006 | 12/1960 | Karde . | |
| 3,161,182 | 12/1964 | Albinson et al. . | |
| 3,355,879 | 12/1967 | Smith et al. | 60/609 |
| 3,400,695 | 9/1968 | Zaruba . | |
| 3,865,087 | 2/1975 | Sihon . | |
| 4,028,892 | 6/1977 | Hinkle . | |
| 4,109,619 | 8/1978 | Morris . | |

OTHER PUBLICATIONS

D. A. Richeson, J. F. Pearce, and S. J. Hinkle, "Application of Air-To-Air Charge Cooling to the Two-Stroke Cycle Diesel Engine", SAE Paper 850317 presented at Detroit, Michigan Exposition Feb. 25–Mar. 1, 1985.

Primary Examiner—Michael Koczo
Attorney, Agent, or Firm—Robert J. Outland

[57] ABSTRACT

The efficiency and charge cooling characteristics of incoming air charges in the air box of a two-cycle diesel engine, preferably of the turbocharged and intercooled type, are improved by the addition of an air box flow guide insert which extends above the air box floor and directs the air smoothly from the air box inlet opening toward the cylinder inlet ports, thereby reducing turbulence and the possibility of heat exchange with engine coolant below the air box lower wall.

8 Claims, 4 Drawing Figures

TWO-CYCLE DIESEL ENGINE AND AIR BOX GUIDE INSERT THEREFOR

TECHNICAL FIELD

This invention relates to internal combustion engines and, especially, to turbocharged two-cycle diesel engines of the type having an air box.

BACKGROUND

U.S. Pat. Nos. 3,161,182 Albinson et al; 3,400,695 Zaruba; 3,865,087 Sihon; and 4,028,892 Hinkle illustrate some of the various arrangements of V-type, two-cycle diesel engines which have been produced by General Motors during a period of many years. All of these engines exhibit uniflow scavenging provided through means including a Roots type positive displacement blower mounted on the engine block and feeding an air box within the block. The air box includes a large central plenum chamber laterally connected with the inlet ports of individual cylinders which admit scavenging and charging air. Exhaust gas and scavenging air flow are discharged through exhaust valves in the cylinder heads. U.S. Pat. No. 4,028,892 further discloses a turbosupercharger driven by exhaust gases to supply compressed air charges to the scavenging blower and air box under conditions of adequate engine load and speed. An aftercooler is mounted within the air box below the scavenging blower.

SUMMARY OF THE INVENTION

The present invention evolved in the modification of an engine of the type shown in U.S. Pat. No. 4,028,892 to utilize air-to-air charge cooling as disclosed in SAE Technical Paper No. 850317, presented at the International Congress held at Detroit, Mich. from Feb. 25—Mar. 1, 1985. In this arrangement, the aftercooler is removed from the air box and an intercooler is substituted between the turbocharger and the positive displacement Roots blower. Further information and details of the arrangement are found in Paper No. 850317, the disclosure of which is hereby incorporated by reference.

In particular, the invention pertains to the addition of an air box insert, or flow guide, within the air box of a two-cycle diesel engine, particularly of the air-to-air charge cooled turbocharged type, to direct incoming air flow from the blower to the cylinder inlet ports in a smooth and efficient manner. The application of such an insert in a particular engine embodiment is also discussed in Paper No. 850317.

In use, the insert mounts upon the floor of the engine air box and extends upwardly to a ridge-like leading edge centered below the Roots blower and associated air box inlet opening. From the leading edge, oppositely angled guide surfaces extend toward the opposite cylinder banks to direct inlet charges toward the cylinder inlet ports. The arrangement provides slightly improved operating efficiency in a turbocharged engine with the aftercooler removed from the air box and it is anticipated that some efficiency improvement could also be obtained in other turbocharged and nonturbocharged engines having a blower charging a central air box.

These and other features and advantages of the invention will be more fully understood from the following description of an exemplary embodiment taken together with the accompanying drawings:

BRIEF DRAWING DESCRIPTION

DETAILED DESCRIPTION

Figure 1:
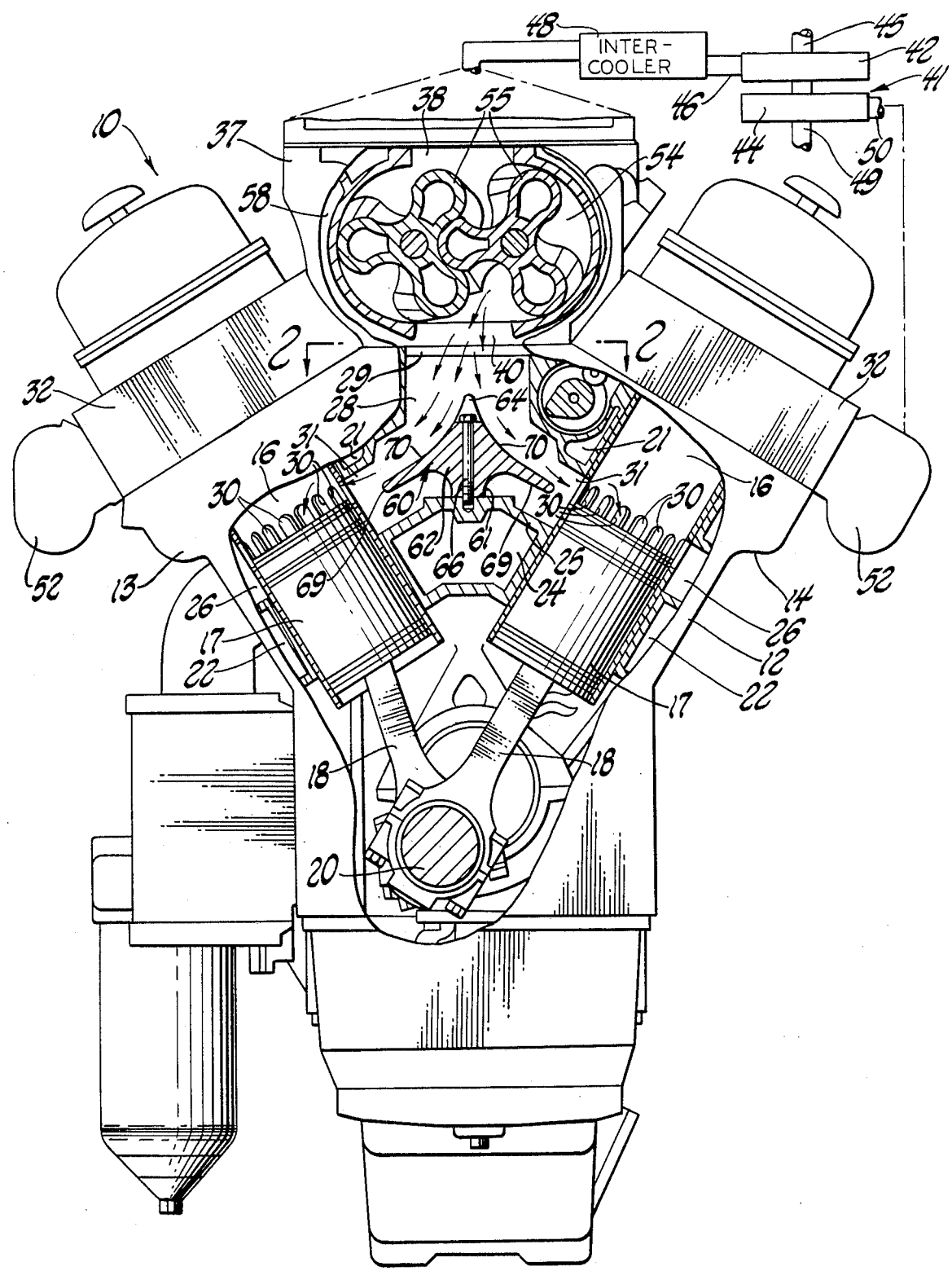
FIG. 1 is an end view of a turbocharged two-cycle diesel engine with a positive displacement blower and an air box mounted flow guide insert in accordance with the invention.
Figure 2:
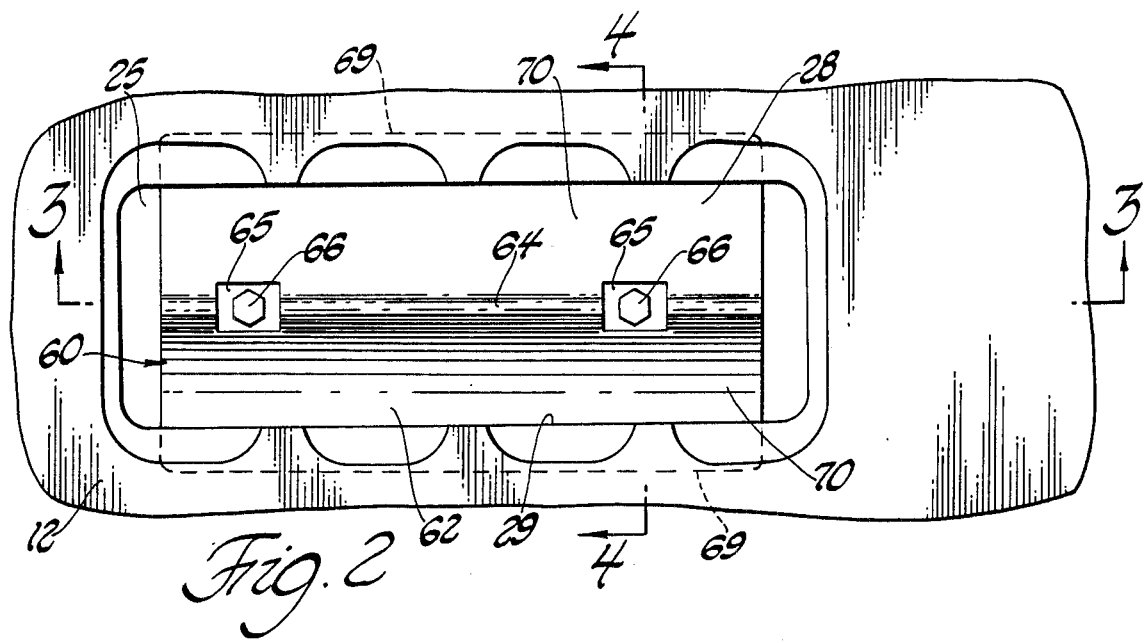
FIG. 2 is a cross-sectional plan view through the air box inlet from the plane indicated by the line 2—2 of FIG. 1.
Figure 3:
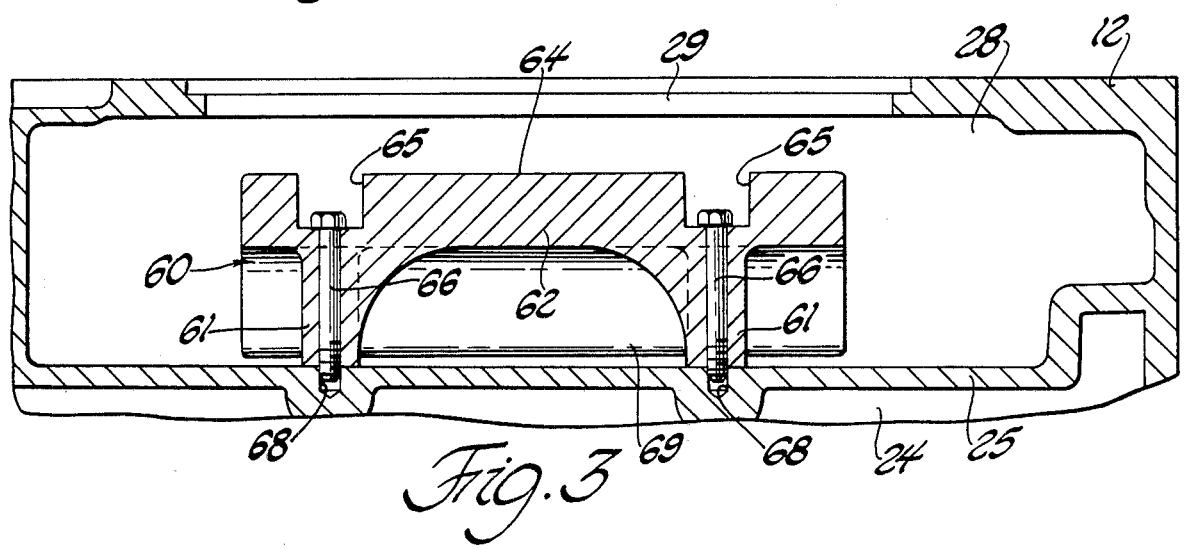
FIG. 3 is a longitudinal cross-sectional view of the air box from the plane indicated by the line 3—3 of FIG. 2.
Figure 4:
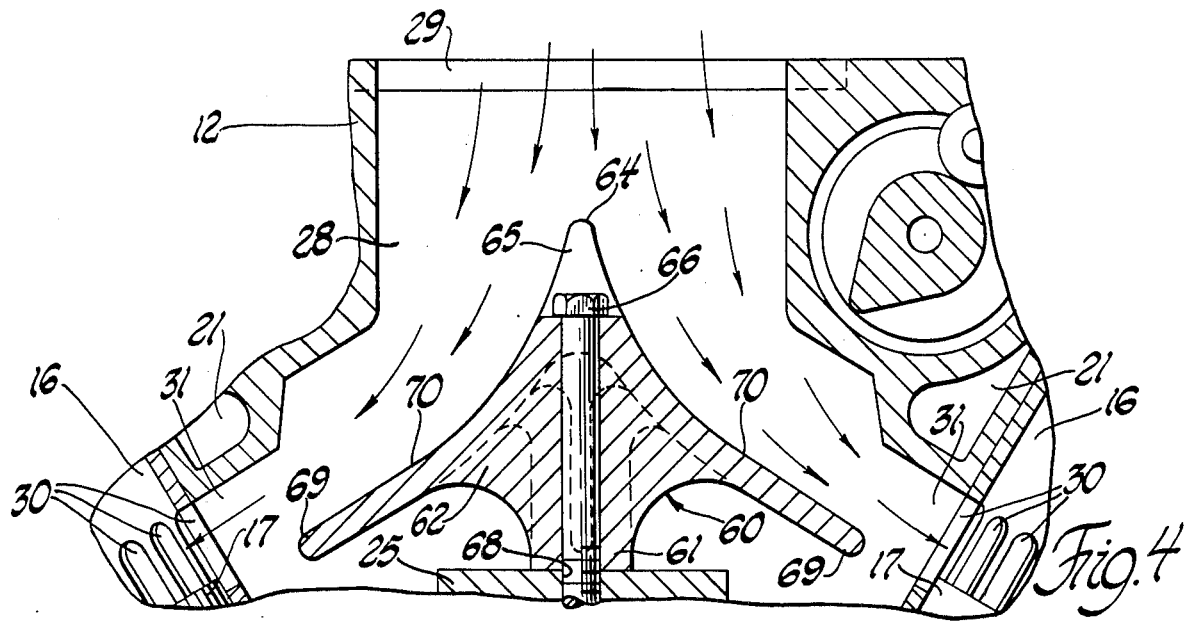
FIG. 4 is an enlarged, transverse, cross-sectional view of the air box from the plane indicated by the line 4—4 of FIG. 2.

In the drawings, numeral 10 generally indicates an internal combustion engine of the turbocharged, two-cycle diesel-type. Engine 10 includes a cast cylinder block 12 having a pair of cylinder banks 13,14 arranged in a "V", each bank being provided with a plurality of longitudinally aligned cylinders 16. A plurality of pistons 17 are reciprocably disposed, one in each cylinder, and connect through connecting rods 18 with a crankshaft 20 rotatably supported in conventional fashion in a lower portion of the block 12.

The cylinder block further defines upper and lower coolant jackets 21,22 which respectively extend around upper and lower portions of the cylinders and are interconnected for coolant flow therebetween. The central portion of the lower coolant jacket 22 extends between the cylinder banks to form a longitudinally extending central chamber 24, closed by an upper wall 25.

The cylinder block also defines an inlet air chamber or air box 26, portions of which extend around the centers of each of the cylinders between the upper and lower coolant jackets from an open central plenum 28. Wall 25, which forms the upper wall of the central coolant chamber 24, also forms the lower wall of the plenum 28. The plenum extends above this wall 25 to an opening 29 in the top of the cylinder block, opposite wall 25 and between the two cylinder banks. Inlet ports 30 are provided around the central portions of the cylinders to permit the flow of air from the air box 26 through side openings 31 of the plenum 28 and the ports 30 into the cylinders as controlled by reciprocating motion of the pistons 17. Each cylinder bank is provided with a cylinder head 32 mounted on the block to close the upper ends of the cylinders of its respective bank. The cylinder heads contain a plurality of exhaust valves, exhaust passages controlled by the valves and a fuel injector for each cylinder, none of which are shown. Actuation of the valves and injectors is conventionally controlled by valve gear operated in timed relation with the engine crankshaft.

A Roots type positive displacement blower 37 is centrally mounted on the cylinder block between the engine cylinder heads. Blower 37 has an inlet opening 38 in the upper portion of its housing and an outlet opening 40 in the lower portion of its housing. The latter connects with the air box inlet opening 29 of the cylinder block.

A turbocharger 41, shown schematically, is preferably mounted on the engine by means, not shown, although it may be separately mounted, if desired. The turbocharger includes a dynamic compressor portion 42 and a turbine portion 44. The compressor portion has an air inlet 45, which receives air from an air cleaner or other source, and an air outlet 46 which connects, through an external intercooler 48, with the blower inlet opening 38 to supply cooled and compressed charging air thereto. The turbine portion includes an exhaust outlet 49 and an inlet 50 connected with exhaust manifolds 52 mounted on the engine cylinder heads and open to the internal exhaust passages, not shown.

The Roots blower 37 includes within its housing a central chamber 54 in which two impellers 55 are rotatably driven to transfer air from the blower inlet 38 to the outlet 40 which connects with the air box inlet 29. A bypass passage 58, extending around the central chamber 54 and controlled by valve means, not shown, is also provided in the blower to permit charging air from the turbocharger to bypass the blower impeller, under predetermined conditions, and enter the engine air box without passing through the impeller chamber 54.

It will be noted that the lower wall 25 of the central air box plenum 28 lies slightly below the level of the inner cylinder inlet ports 30. Thus, air entering the plenum through the inlet opening 29 would, without the addition of means according to the invention, be generally undirected as to flow through the plenum and would be free to flow against the lower wall 25 which is in heat exchange relation with the coolant chamber 24 of the lower jacket. Under certain operating conditions, heat from the engine coolant might be transferred to the inlet charging air through this wall, reducing the charging volume delivered to the cylinders. In addition, turbulence in the nondirected flow may cause flow losses during passage of the charge through the air box.

To avoid the foregoing problems and improve efficiency, the engine is provided, according to the invention, with an air box flow guide insert 60 mounted on the lower wall 25. The insert 60 may be formed of any suitable material, aluminum having been selected in the present instance to minimize weight. The insert appears in cross-section to have the form generally of a relatively short Christmas tree, having a pair of legs 61 supporting a body 62. The insert body has a longitudinally extending leading edge, or ridge, 64 facing the air box inlet opening 29 and extending for a longitudinal distance slightly shorter than the length of the opening 29. The ridge 64 is broken intermediate its ends by recesses 65 in which are received bolts 66. These extend through the body 62 and legs 61 into threaded openings 68 in the lower wall, or floor, 25 of the air box to retain the insert 60 in fixed position within the plenum 28. The legs 61 extend below the body 62 and have relatively small cross-sectional areas at their lower ends where they engage lower wall 25 to support the body 62 in spaced relation therewith. The body 62 further includes a pair of roof-like oppositely extending guide walls 69 spaced above the floor, and; having upper guide surfaces 70 extending downwardly and outwardly from the leading edge 64, in a smoothly directed plane or curved configuration, toward the bottom edge of the cylinder inlet ports 30.

In operation, scavenging and charging air flow entering the central plenum 28 of the air box 26 is divided by the ridge or leading edge 64 of the flow guide insert 60 into two flow streams. These are directed in relatively smooth paths downwardly and outwardly through the side openings 31 of the plenum toward the cylinder inlet ports 30 where the air is admitted to the cylinders when the pistons are in their lower positions, below the port openings. In this manner, the addition of the flow guide insert in the air box plenum 28 provides for a smooth flow of the charging air to the cylinder inlet ports, minimizing flow losses. The insert also prevents substantial contact of the air streams with the bottom wall 25 and, thus, limits the transfer of heat between the engine coolant in the central chamber 24 below the air box and the incoming charging air. Conduction of heat through the insert is also limited by the spacing of the body 62 from the lower wall 25 and the small area of contact of the legs 61 with the wall 25.

Further details of the construction and operation of an engine and system in accordance with the invention may be found in the previously noted SAE Technical Paper No. 850317. While the invention has been disclosed by reference to a specific embodiment chosen for purposes of illustration, it should be understood that numerous changes could be made without departing from the inherent concepts of the invention described. Accordingly, it is intended that the invention not be limited to the described embodiment, but that it have the full scope permitted by the following claims.

The embodiments of the invention in which an exclusive property or privilege is claimed are defined as follows:

1. An internal combustion engine having two banks of cylinders arranged V-fashion in a housing, said cylinders each having a plurality of inlet ports intermediate opposite ends for admitting inlet air to the cylinders, said housing defining an enlarged air chamber within the "V" between the cylinder banks and having a bottom wall spaced below the inlet ports, side openings above the bottom wall communicating the chamber with said cylinder inlet ports and an inlet opening opposite the bottom wall, wherein the improvement comprises a flow guide disposed within the air chamber and having a leading edge extending longitudinally between the cylinder banks, facing the inlet opening and spaced from the bottom wall above the level of the cylinder inlet ports, and a pair of guide walls spaced above the bottom wall and having guide surfaces extending from the leading edge, one toward each of the cylinder banks and angled generally toward the inlet ports to direct inlet air charges entering the air chamber through the inlet opening smoothly toward the inlet ports of the cylinders in the two banks.

2. An engine according to claim 1 wherein said flow guide is removable and includes means for mounting said guide on the air chamber bottom wall, said mounting means contacting the bottom wall with a relatively small cross-sectional area to limit heat conduction therebetween.

3. An engine according to claim 2 wherein the flow guide surfaces are smoothly curved outwardly from said leading edge toward the cylinder banks to provide a smooth transition for directional change of the incoming air flow.

4. An engine according to claim 2 wherein the removable flow guide is made of aluminum for light weight.

5. An engine according to claim 1 and further including a positive displacement blower mounted on the engine housing above the air chamber inlet opening to provide charging air to the air chamber.

6. An engine according to claim 5 and further including a turbocharger connected through an intercooler with the blower to provide charging air thereto, and a bypass passage in the blower housing for allowing air from the turbocharger to bypass the blower.

7. A removable flow guide for use in the air box of a two-cycle diesel engine, said flow guide comprising
   a body having support legs extending below the body and of relatively small cross-sectional area at their lower ends for mounting the body upon and in spaced relation above a lower wall of an air chamber in the air box,
   a longitudinal ridge defining a leading edge above the support legs and facing away from said legs, and a pair of guide surfaces on the body extending continuously from the ridge in two angularly opposite directions downwardly toward the legs but outwardly therefrom to divide incoming air charges impinging on the ridge and direct them smoothly past the air chamber lower wall toward cylinder inlet ports of the associated engine.

8. A flow guide as in claim 7 and formed of aluminum for light weight, said guide being provided with bolt openings through the legs and ridge portions of the body for securing the flow guide in the engine air box.

* * * * *